(12) United States Patent
Abdelhamid et al.

(10) Patent No.: US 10,409,828 B2
(45) Date of Patent: Sep. 10, 2019

(54) METHODS AND APPARATUS FOR INCREMENTAL FREQUENT SUBGRAPH MINING ON DYNAMIC GRAPHS

(71) Applicant: International Business Machines Corporation, Armonk, NY (US)

(72) Inventors: Ehab Abdelhamid Mohammed Abdelhamid, Jeddah (SA); Bishwaranjan Bhattacharjee, Yorktown Heights, NY (US); Mustafa Canim, Ossining, NY (US); Yuan Chi Chang, Armonk, NY (US); Mohammad Sadoghi Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 15/223,475

(22) Filed: Jul. 29, 2016

(65) Prior Publication Data
US 2018/0032587 A1 Feb. 1, 2018

(51) Int. Cl.
*G06F 16/2458* (2019.01)
*G06F 16/901* (2019.01)

(52) U.S. Cl.
CPC ...... *G06F 16/2465* (2019.01); *G06F 16/9024* (2019.01)

(58) Field of Classification Search
CPC ......... G06F 17/30539; G06F 17/30958; G06F 17/30297; G06F 17/30572; G06F 16/9024;

(Continued)

(56) References Cited

U.S. PATENT DOCUMENTS 8,204,904 B2 6/2012 Bonchi et al.
9,244,983 B2 1/2016 Yang et al.
(Continued)

FOREIGN PATENT DOCUMENTS

CN 104899292 A 9/2015

OTHER PUBLICATIONS

Mel, et al., "The NIST Definition of Cloud Computing", Special Publication 800-145, Computer Security Division, Information Technology Laboratory, National Institute of Standards and Technology, Gaithersburg, MD, pp. M-7 thru M-13 (2011).
(Continued)

*Primary Examiner* — Dennis Truong
(74) *Attorney, Agent, or Firm* — Ryan, Mason & Lewis, LLP

(57) ABSTRACT

Methods and apparatus are provided for incremental frequent subgraph mining on dynamic graphs. An exemplary subgraph mining method comprises maintaining a set of embeddings comprising matching embeddings of a given subgraph in an input graph; maintaining a first fringe set of subgraphs comprising subgraphs substantially on a fringe of frequent subgraphs in the input graph that satisfy a predefined support threshold; maintaining a second fringe set of subgraphs comprising subgraphs substantially on a fringe of infrequent subgraphs in the input graph that do not satisfy the predefined support threshold; for an edge addition, checking a support of the subgraphs in the second fringe set based on the set of the embeddings and searching for new embeddings created by the edge addition; and for an edge deletion, removing obsolete embeddings that comprise the deleted edge from the first fringe set based on the set of embeddings.

20 Claims, 11 Drawing Sheets

(58) Field of Classification Search
CPC .. G06F 16/2465; G06F 16/901; G06F 16/213; G06F 16/288
USPC ........................................................ 707/776
See application file for complete search history.

(56) References Cited

U.S. PATENT DOCUMENTS

| | | | | |
|---|---|---|---|---|
| 2006/0036564 | A1* | 2/2006 | Yan | G06F 17/30247 |
| 2009/0303237 | A1* | 12/2009 | Liu | H04L 63/0414 345/440 |
| 2011/0078189 | A1* | 3/2011 | Bonchi | G06Q 10/10 707/776 |
| 2013/0097138 | A1* | 4/2013 | Barkol | G06F 17/30466 707/706 |
| 2013/0144893 | A1* | 6/2013 | Voigt | G06F 17/3097 707/754 |
| 2017/0323028 | A1* | 11/2017 | Jonker | G06F 17/2235 |

OTHER PUBLICATIONS

Wang et al., "Continuous Subgraph Pattern Search over Graph Streams", IEEE International Conference on Data Engineering, pp. 393-404 (2009).

Björn Bringmann, "Mining Patterns in Structured Data," Katholieke Universiteit Leuven, Ph.D. Thesis, Sep. 2009, 205 pages.

B. Bringmann et al., "What is Frequent in a Single Graph?" Proceedings of the 12th Pacific-Asia Conference on Advances in Knowledge Discovery and Data Mining (PAKDD), May 2008, pp. 858-863.

C. Chen et al., "gApprox: Mining Frequent Approximate Patterns from a Massive Network," 7th IEEE International Conference on Data Mining (ICDM), Oct. 2007, pp. 445-450.

J. Cheng et al., "Fast Graph Pattern Matching," Proceedings of the 24th IEEE International Conference on Data Engineering (ICDE), Apr. 2008, pp. 913-922.

M. Elseidy et al., "GRAMI: Frequent Subgraph and Pattern Mining in a Single Large Graph," Proceedings of the Very Large Data Bases (VLDB) Endowment, Sep. 2014, pp. 517-528, vol. 7, No. 7.

M. Fiedler et al., "Subgraph Support in a Single Large Graph," 7th IEEE International Conference on Data Mining Workshops (ICDMW), Oct. 2007, pp. 399-404.

H. He et al., "Graphs-at-a-time: Query Language and Access Methods for Graph Databases," Proceedings of the ACM SIGMOD International Conference on Management of Data, Jun. 2008, pp. 405-418.

A. Khan et al., "Towards Proximity Pattern Mining in Large Graphs," Proceedings of the ACM SIGMOD International Conference on Management of Data, Jun. 2010, pp. 867-878.

M. Kuramochi et al., "Frequent Subgraph Discovery," Proceedings of the IEEE International Conference on Data Mining (ICDM), Nov.-Dec. 2001, pp. 313-320.

M. Kuramochi et al., "GREW—A Scalable Frequent Subgraph Discovery Algorithm," 4th IEEE International Conference on Data Mining (ICDM), Nov. 2004, pp. 439-442.

M. Kuramochi et al., "Finding Frequent Patterns in a Large Sparse Graph," Journal of Data Mining and Knowledge Discovery, Nov. 2005, pp. 243-271, vol. 11, No. 3.

J. Lee et al., "An In-Depth Comparison of Subgraph Isomorphism Algorithms in Graph Databases," Proceedings of the Very Large Data Bases (VLDB) Endowment, Dec. 2012, pp. 133-144, vol. 6, No. 2.

J. J. McGregor, "Relational Consistency Algorithms and Their Application in Finding Subgraph and Graph Isomorphisms," Information Sciences, Nov. 1979, pp. 229-250, vol. 19, No. 3.

S. Ranu et al., "GraphSig: A Scalable Approach to Mining Significant Subgraphs in Large Graph Databases," IEEE 25th International Conference on Data Engineering (ICDE), Mar.-Apr. 2009, pp. 844-855.

Z. Sun et al., "Efficient Subgraph Matching on Billion Node Graphs," Proceedings of the Very Large Data Bases (VLDB) Endowment, May 2012, pp. 788-799, vol. 5, No. 9.

L.T. Thomas et al., "MARGIN: Maximal Frequent Subgraph Mining," ACM Transactions on Knowledge Discovery from Data (TKDD), Oct. 2010, 11 pages, Article No. 10, vol. 4, No. 3.

J.R. Ullmann, "An Algorithm for Subgraph Isomorphism," Journal of the Association for Computing Machinery (JACM), Jan. 1976, pp. 31-42, vol. 23, No. 1.

X. Yan et al., "Mining Significant Graph Patterns by Leap Search," Proceedings of the ACM SIGMOD International Conference on Management of Data, Jun. 2008, pp. 433-444.

X. Yan et al., "gSpan: Graph-Based Substructure Pattern Mining," Proceedings of the IEEE International Conference on Data Mining (ICDM), Dec. 2002, pp. 721-724.

X. Yan et al., "CloseGraph: Mining Closed Frequent Graph Patterns," Proceedings of the 9th ACM SIGKDD International Conference on Knowledge Discovery and Data Mining, Aug. 2003, pp. 286-295.

F. Zhu et al., "gPrune: A Constraint Pushing Framework for Graph Pattern Mining," Proceedings of the 11th Pacific-Asia Conference on Advances in Knowledge Discovery and Data Mining (PAKDD), May 2007, pp. 388-400.

L. Zou et al., "Distance-Join: Pattern Match Query in a Large Graph Database," Proceedings of the Very Large Data Bases (VLDB) Endowment, Aug. 2009, pp. 886-897, vol. 2, No. 1.

C.C. Aggarwal et al., "On Dense Pattern Mining in Graph Streams," Proceedings of the Very Large Data Bases (VLDB) Endowment, Sep. 2010, pp. 975-984, vol. 3, No. 1-2.

H. Aksu et al, "Distributed k-Core View Materialization and Maintenance for Large Dynamic Graphs," IEEE Transactions on Knowledge and Data Engineering, Oct. 2014, pp. 2439-2452, vol. 26, No. 10.

A. Bifet et al., "Mining Frequent Closed Graphs on Evolving Data Streams," Proceedings of the 17th ACM SIGKDD International Conference on Knowledge Discovery and Data Mining, Aug. 2011, pp. 591-599.

K.M. Borgwardt et al., "Pattern Mining in Frequent Dynamic Subgraphs," 6th International Conference on Data Mining (ICDM), Dec. 2006, pp. 818-822.

Y. Chi et al., "Moment: Maintaining Closed Frequent Itemsets Over a Stream Sliding Window," 4th IEEE International Conference on Data Mining (ICDM), Nov. 2004, pp. 59-66.

M. Deshpande et al., "Frequent Sub-Structure-Based Approaches for Classifying Chemical Compounds," IEEE Transactions on Knowledge Data Engineering, Aug. 2005, pp. 1036-1050, vol. 17, No. 8.

P. Desikan et al., "Mining Temporally Evolving Graphs," Proceedings of the 6th WEBKDD Workshop: Webmining and Web Usage Analysis (WEBKDD) in conjunction with the 10th ACM SIGKDD Conference (KDD), Aug. 2004, pp. 13-22, vol. 22.

W. Fan et al., "Incremental Graph Pattern Matching," Proceedings of the ACM SIGMOD International Conference on Management of Data, Jun. 2011, pp. 925-936.

C. Gao et al., "Efficient Itemset Generator Discovery over a Stream Sliding Window," Proceedings of the 18th ACM Conference on Information and Knowledge Management (CIKM), Nov. 2009, pp. 355-364.

C. Giannella et al., "Mining Frequent Patterns in Data Streams at Multiple Time Granularities," Next Generation Data Mining, 2003, pp. 191-212, vol. 212.

J. Huan et al., "SPIN: Mining Maximal Frequent Subgraphs from Graph Databases," Proceedings of the 10th ACM SIGKDD International Conference on Knowledge Discovery and Data Mining (KDD), Aug. 2004, pp. 581-586.

N. Jiang et al., "CFI-Stream: Mining Closed Frequent Itemsets in Data Streams," Proceedings of the 12th ACM SIGKDD International Conference on Knowledge Discovery and Data Mining (KDD), Aug. 2006, pp. 592-597.

D. Lee et al., "Finding Maximal Frequent Itemsets over Online Data Streams Adaptively," Proceedings of the 5th IEEE International Conference on Data Mining (ICDM), Nov. 2005, 8 pages.

(56) References Cited

OTHER PUBLICATIONS

H. Li et al., "A Simple but Effective Maximal Frequent Itemset Mining Algorithm Over Streams," Journal of Software, Jan. 2012, pp. 25-32, vol. 7, No. 1.

H.-F Li et al., "Incremental Updates of Closed Frequent Itemsets Over Continuous Data Streams," Expert Systems with Applications, Mar. 2009, pp. 2451-2458, vol. 36, No. 2.

G. Mao et al., "Mining Maximal Frequent Itemsets from Data Streams," Journal of Information Science, Mar. 2007, pp. 251-262, vol. 33, No. 3.

A. Ray et al., "Frequent Subgraph Discovery in Large Attributed Streaming Graphs," Proceedings of the 3rd International Workshop on Big Data, Streams, and Heterogeneous Source Mining: Algorithms, Systems, Programming Models and Applications (BIGMINE), Aug. 2014, pp. 166-181, vol. 36.

M. Seeland et al., "Online Structural Graph Clustering Using Frequent Subgraph Mining," Proceedings of the European Conference on Machine Learning and Knowledge Discovery in Databases: Part III (ECML PKDD), Sep. 2010, pp. 213-228.

B. Wackersreuther et al., "Frequent Subgraph Discovery in Dynamic Networks," Proceedings of the 8th Workshop on Mining and Learning with Graphs (MLG), Jul. 2010, pp. 155-162.

X. Yan et al., "Graph Indexing: A Frequent Structure-Based Approach," Proceedings of the ACM SIGMOD International Conference on Management of Data, Jun. 2004, pp. 335-346.

"NIST Cloud Computing Program", http://www.nist.gov/itl.cloud/, downloaded on Jul. 28, 2016.

L. Zou et al., "K-Automorphism: A General Framework for Privacy Preserving Network Publication," Proceedings of the Very Large Data Bases (VLDB) Endowment, Aug. 2009, pp. 946-957, vol. 2, No. 1.

E.W. Dijkstra, "A Note on Two Problems in Connexion with Graphs," Numerische Mathematik, Dec. 1959, pp. 269-271, vol. 1, No. 1.

S. Parthasarathy et al., "Incremental and Interactive Sequence Mining," Proceedings of the 8th International Conference on Information and Knowledge Management, Nov. 1999, pp. 251-258.

S. Thomas et al., "An Efficient Algorithm for the Incremental Updation of Association Rules in Large Databases," Proceedings of the International Conference on Knowledge Discovery and Data Mining (KDD), Jul. 1997, pp. 263-266.

Disclosed Anonymously, "A Method and System for Extracting Discriminative Frequent Patterns from Large Scale Corpus," IP.com No. IPCOM000210880D, Sep. 14, 2011, 5 pages.

Disclosed Anonymously, "Method for Architecture-Aware Dynamic State Management in Parallel Frequent Structure Mining," IP.com No. IPCOM000146809D, Feb. 23, 2007, 8 pages.

Disclosed Anonymously, "System and Method to Dynamically Create Optimum Mining Flows in a Strongly Typed Analytics System," IP.com No. IPCOM000226486D, Apr. 8, 2013, 4 pages.

\* cited by examiner

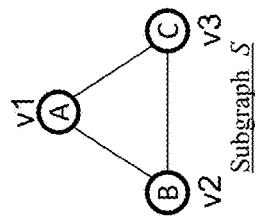
FIG. 1B
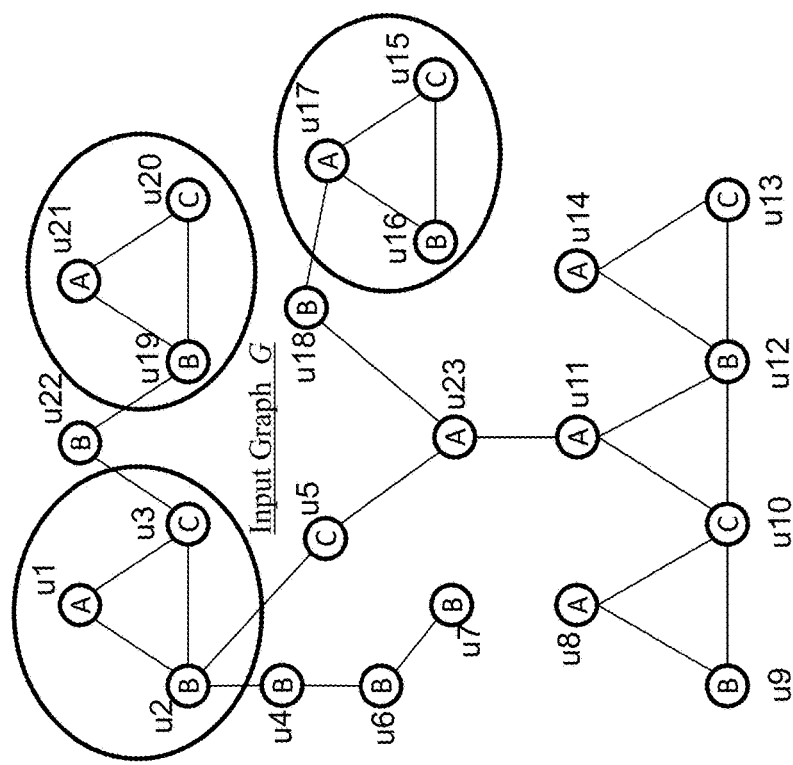
FIG. 1C
FIG. 1A

Input: $G$ the input graph, $\tau$ support threshold, $U$ Dynamic updates

1 if $U.class$ *was not seen before* then Add $U$ to *MIFS*
2 FRINGE ← MINE($G_D$, $\tau$)
3 if $U$ *is edge addition* then
4    foreach $S \in MIFS$ do
5       if SUBGRAPH($U$,$S$) then UPDATESUPPORT($G$, $\tau$, $S$)
6       if $S$ *changes status* then UPDATEFRINGE(FRINGE, $S$)
7 else
8    foreach $S \in MFS$ do
9       if SUBGRAPH($U$,$S$) then UPDATESUPPORT($G$, $\tau$, $S$)
10       if $S$ *changes status* then UPDATEFRINGE(FRINGE, $S$)

FIG. 4

Figure 6C:
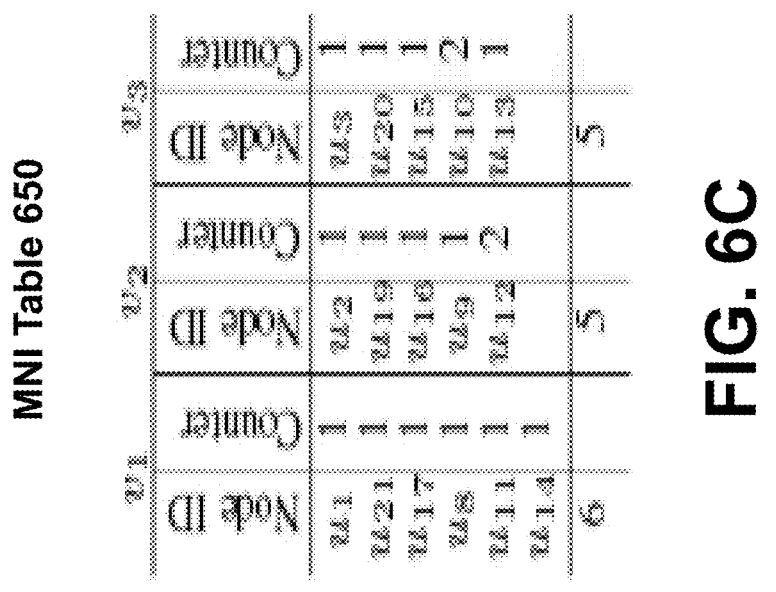

MNI Table 650

| $Q_{1,1}$ | | $Q_{1,2}$ | | $Q_{1,3}$ | |
|---|---|---|---|---|---|
| Node ID | Counter | Node ID | Counter | Node ID | Counter |
| n_1,1 | 1 | n_1,2 | 1 | n_1,3 | 1 |
| n_1,7 | 1 | n_1,9 | 1 | n_1,10 | 1 |
| n_1,8 | 1 | n_1,6 | 1 | n_1,15 | 1 |
| n_1,11 | 1 | n_1,12 | 2 | n_1,10 | 2 |
| n_1,14 | 1 | | | n_1,13 | 1 |
| 6 | | 5 | | 5 | |

Process a set of update operations instead of one by one:
- Remove duplicates
- Remove updates that cancel each other
- Group updates, for each group processing is done once

FIG. 7

METHODS AND APPARATUS FOR INCREMENTAL FREQUENT SUBGRAPH MINING ON DYNAMIC GRAPHS

FIELD

The present application generally relates to mining techniques, and, more particularly, to frequent subgraph mining techniques.

BACKGROUND

Frequent Subgraph Mining (FSM) is a well-known operation on graphs, and plays an important role in many graph-based applications, such as indexing, classification, and social network analysis. Most existing efforts in mining frequent subgraphs target graphs that do not change over time. However, recent practical applications utilize graphs that are continuously being updated.

Emerging graph-based applications, however, are now required to manage substantially continuously changing graphs, such as social networks and web graphs. Social network graphs, for example, with the frequent addition and removal of users, as well as the evolving relationships among users, exhibit rapid changes in size and structure. Thus, an efficient solution for mining such graphs is important for these applications.

A need therefore exists for improved frequent subgraph mining techniques that support efficient frequent subgraph mining on dynamic graphs by maintaining a reduced amount of information relative to conventional techniques, namely, the graph's embeddings that are collected during the incremental computations.

SUMMARY

In one embodiment of the present invention, techniques for incremental frequent subgraph mining on dynamic graphs are provided. An exemplary computer-implemented subgraph mining method can include maintaining a set of embeddings comprising matching embeddings of a given subgraph in an input graph; maintaining a first fringe set of subgraphs comprising subgraphs substantially on a fringe of frequent subgraphs in the input graph that satisfy a pre-defined support threshold; maintaining a second fringe set of subgraphs comprising subgraphs substantially on a fringe of infrequent subgraphs in the input graph that do not satisfy the predefined support threshold; for an edge addition, checking a support of the subgraphs in the second fringe set based on the set of the embeddings and searching for new embeddings created by the edge addition; and for an edge deletion, removing obsolete embeddings that comprise the deleted edge from the first fringe set based on the set of embeddings.

In at least one embodiment, the set of the embeddings further comprises, for each subgraph satisfying a predefined support threshold, only a substantially minimal set of embeddings that satisfy the predefined support threshold. In addition, for each subgraph that does not satisfy the predefined support threshold, the set of the embeddings optimally further comprises a substantially entire set of the embeddings.

In one or more embodiments, the set of the embeddings further comprises a hash table of the embeddings indexed by a key; an inverted index from the given graph node to the embeddings of the given subgraph that comprise the given node; and/or a count value of how many of the embeddings are pointed to by the given node.

In at least one embodiment, a plurality of update operations are batched to (1) evaluate each subgraph once for multiple edge changes, (2) prune updates that cancel each other out, and/or (3) remove redundant updates. Evaluation of one or more invalid nodes are optionally postponed in determining whether a given subgraph satisfies the predefined support threshold. An invalid node is a node that belongs to the input graph and cannot be a part of the given subgraph in the input graph.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1A illustrates an example input graph G, used to illustrate at least one embodiment of the invention;

FIG. 1B illustrates a subgraph S of the graph G of FIG. 1A;

FIG. 1C is a table illustrating a minimum image based support (MNI) of the embedding of the subgraph S of FIG. 1B in the graph G of FIG. 1A, with a particular support;

FIG. 4 illustrates exemplary pseudo code of a fringe based mining process according to one embodiment of the invention;

FIG. 6C shows a corresponding MNI table for subgraph S, according to one embodiment of the invention;

FIG. 7 illustrates exemplary pseudo code of an operation batching process according to one embodiment of the invention;

DETAILED DESCRIPTION

Figure 2:
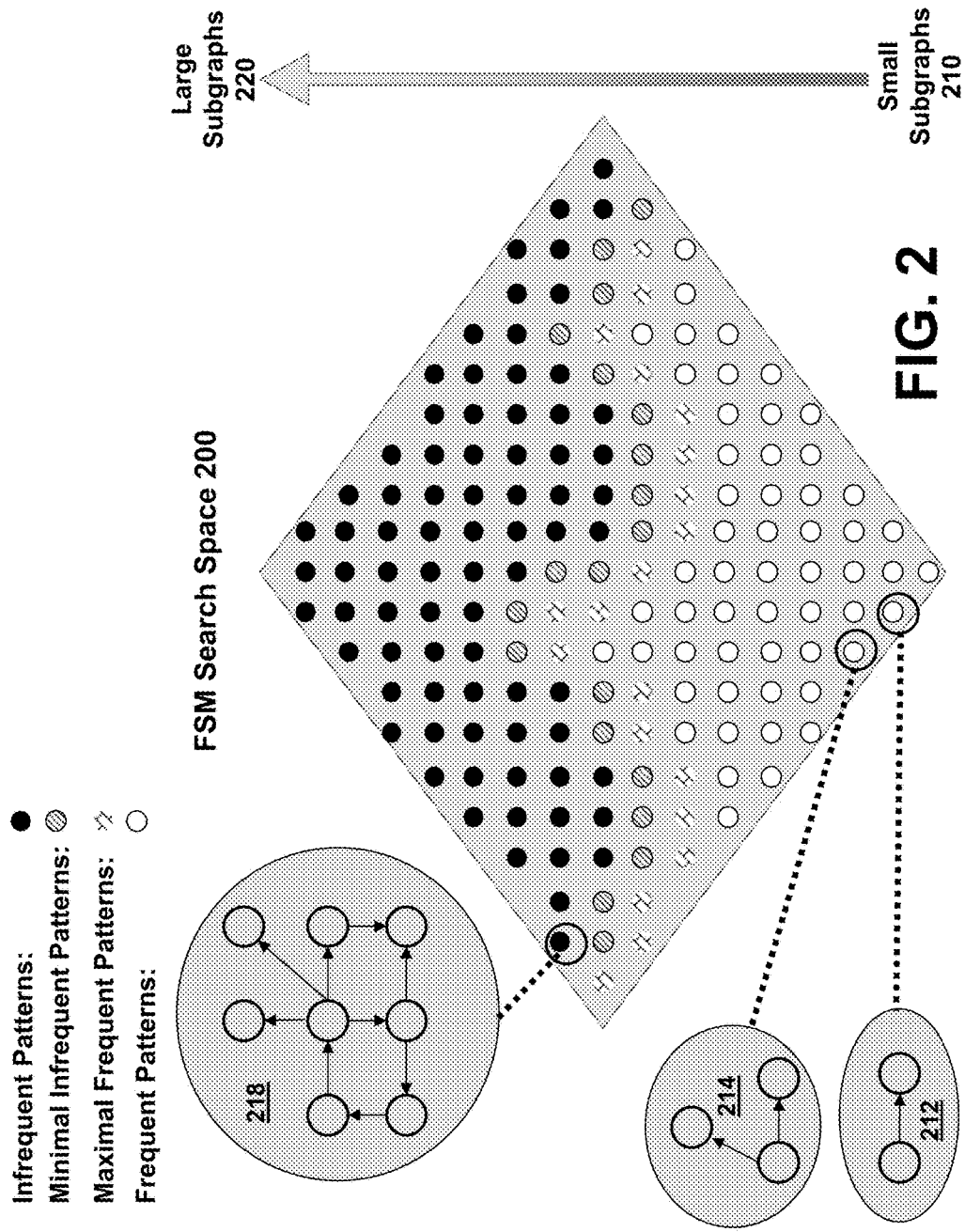
FIG. 2 illustrates a search space for a typical frequent subgraph mining task according to one embodiment of the invention.

Illustrative embodiments of the present invention will be described herein with reference to exemplary communication, storage, and processing devices. It is to be appreciated, however, that the invention is not restricted to use with the particular illustrative configurations shown. One or more embodiments of the present invention provide methods and apparatus for incremental frequent subgraph mining on dynamic graphs. The disclosed frequent subgraph mining techniques can be applied in any application where frequent subgraph mining is performed over a dynamic graph, such as social network analysis and visualization.

In one or more embodiments, frequent subgraph mining techniques are provided that maintain a minimal amount of information with respect to the graph's embeddings that are collected during the incremental computations. In at least one embodiment, a data structure is employed for fast embeddings lookup that can be efficiently updated to support frequent subgraph minimal on dynamic graphs. Furthermore, one or more embodiments of the invention employ improved batching and pruning strategies to further reduce the cost of embeddings maintenance.

Frequent Subgraph Mining (FSM)

The goal of Frequent Subgraph Mining (FSM) is to find all subgraphs that have support larger than or equal to a support threshold $\tau$. Besides being crucial for graph analysis, FSM is a basic building block of many techniques in multidisciplinary domains, such as graph clustering and classification, protein functionality prediction, graph indexing, privacy-preserving and image processing. Most of the work done in FSM is to support a database of small graphs. There are few efforts for mining a single large graph, which is a challenging and more general problem. See, for example, M. Kuramochi and G. Karypis, "Finding Frequent Patterns in a Large Sparse Graph," Data Mining and Knowledge Discovery, Vol. 11, No. 3, 243-71 (2005).

Emerging graph-based applications are now required to manage continuously changing graphs, such as social networks and web graphs. For example, the Facebook™ social network, currently the most popular social network, is a large dynamic graph. Facebook™ currently has 1.59 billion monthly active users with an estimated increase of 14% year-over-year. An efficient FSM solution is needed to mine such a massive graph with a rapid change in size and structure. A number of techniques have been proposed or suggested to solve FSM over large graphs that evolve, such as mining a stream of small graphs. See, for example, A. Bifet et al., "Mining Frequent Closed Graphs on Evolving Data Streams," Proc. Of SIGKDD, pages 591-599. ACM, 2011; and/or A. Ray et al., "Frequent Subgraph Discovery in Large Attributed Streaming Graphs," BigMine, 166-81 (2014).

A number of solutions have also been proposed for the problem of mining frequent itemsets over a stream of transactions. See, for example, G. Mao et al., "Mining Maximal Frequent Item Sets From Data Streams," J. of Information Science (2007); and/or J. X. Yu et al., "False Positive or False Negative: Mining Frequent Itemsets From High Speed Transactional Data Streams," Proc. of the VLDB Endowment (PVLDB), 204-15 (2004).

Moment, for example, a well-known frequent itemset mining system, incrementally updates a "fringe" of itemsets. See, for example, Y. Chi et al., "Moment: Maintaining Closed Frequent Itemsets Over a Stream Sliding Window," Proc. IEEE International Conference on Data Mining (ICDM), 59-66 (2004). By using this fringe, much pruning is achieved and efficiency is significantly improved. Though, a straightforward application of this approach is not feasible for the subgraph mining context as highlighted herein. Incremental graph indexes are used to improve the performance of subgraph matching for evolving graphs. Maintaining an incremental index imposes extra overhead after each graph update. Moreover, the goal of these indexes is to support generic subgraph matching queries. These two obligations are not required for FSM, where specific subgraphs are the focus of substantially continuous evaluations, and many of the graph updates can be safely ignored in favor of better performance.

To support mining a dynamic graph using existing solutions, a straightforward approach is to run an FSM algorithm from scratch after every graph update. A typical FSM algorithm employs a number of evaluation-then-extension iterations; candidate subgraphs are evaluated and the frequent ones are extended. These iterations continue until no more frequent subgraphs are found. FSM is known to be an expensive task due to its reliance on subgraph matching algorithms for the evaluation step. For instance, it has been said that one iteration of the mining task on a graph with several million edges can take hours to finish on a commodity server. Thus, following a naive solution that repeats FSM after each graph update is practically infeasible.

In one or more embodiments, an incremental technique for mining large dynamic graphs, referred to herein as IncGM (Incremental Graph Mining), is provided. One or more embodiments employ the "fringe" concept for the graph mining context. Fringe subgraphs are representative subgraphs that lay on the border between frequent and infrequent subgraphs. Also, fringe subgraphs are the focus of substantially continuous evaluation for either being frequent or not. By utilizing the fringe, a significant pruning of the search space is achieved. Nonetheless, there may still be large overhead needed for evaluating these subgraph. Thus, one or more embodiments employ a substantially minimal number of embeddings to alleviate such overhead. These embeddings are used to avoid or minimize the number of calls to subgraph matching. A novel incremental index, referred to as a fast embeddings lookup store (FELS), is disclosed to efficiently maintain the stored embeddings. This index is dynamically updated to reflect the current status of the system while consuming a minimal memory overhead. Moreover, a set of optional optimizations are disclosed that significantly improve the performance by reordering the execution so that quicker decisions can be made. Such reordering is based on information collected while processing past graph updates. Finally, in order to cope with a massive number of updates, the exemplary embodiment of IncGM supports a batch of updates. This batching relies on grouping updates and applying some pruning techniques to reduce the overall cost.

There has been a recent focus on dynamic graphs due to the nature of emerging applications. A dynamic graph $G_D = (V_D; E_D; L_D)$ comprises a set of nodes $V_D$, a set of edges $E_D \subseteq V_D \times V_D$ and a function $L_D$ that assigns labels to nodes and edges. Over time, $V_D$ may change by node additions or deletions, $E_D$ may change by edge additions or deletions, and $L_D$ may change the label assignment of existing nodes and edges.

An important task in graphs is to find matches of one graph in another graph, which is called subgraph isomorphism. Each match resulting from the subgraph isomorphism of a subgraph S to a graph G is called an embedding of S in G. For a subgraph S to be frequent in an input graph G, it has to have support $\geq \tau$, the user given support threshold. All FSM algorithms need to utilize an anti-monotone support metric, this is essential for search space pruning. Being anti-monotone requires that the support of a subgraph $S_1$ to be greater than or equal to the support of its supergraph $S_2$. Based on the anti-monotone property, there is no need to check $S_2$ if $S_1$ is found to be infrequent. Thus, the search space can be significantly pruned. The most intuitive support metric is to count the number of embeddings of S in G. But, this metric is not antimonotone.

FIG. 1A illustrates an input graph G, used to illustrate at least one embodiment of the invention. FIG. 1B illustrates a subgraph S to the graph G of FIG. 1A. FIG. 1C is a table illustrating the minimum image based support (MNI) of the subgraph S (FIG. 1B) embeddings in the graph G of FIG. 1A, when the support τ is equal to 3.

In the graph G of FIG. 1A, let $S_1$ be the subgraph containing a single node labeled 'A'. The list of its embeddings is: $\{u_1, u_{21}, u_{23}, u_{17}, u_8, u_{11}, u_{14}\}$, which is of size 7. Let $S_2$ be the subgraph 'A'_'B' (i.e., a supergraph of $S_1$). The list of embeddings of $S_2$ is: $\{(u_1, u_2), (u_{21}, u_{19}), (u_{17}, u_{18}), (u_{17}, u_{16}), (u_{23}, u_{18}), (u_{14}, u_{12}), (u_{11}, u_{12}), (u_8, u_9)\}$. The number of these embeddings is 8, which is more than those for $S_1$. As such, this metric does not follow the anti-monotone property, resulting in infeasible overhead. Several anti-monotone support metrics have been proposed for mining a single graph. Out of these metrics, the minimum image based support (MNI), described in B. Bringmann and S. Nijssen, "What is Frequent in a Single Graph?," Proc. of Pacific-Asia Conference on Knowledge Discovery and Data Mining (PAKDD), 858-63 (2008), is often considered the most efficient, since the computation of other metrics is NP-complete. Hence, one or more embodiments of the invention employ an MNI metric. The MNI metric is defined as follows:

Given ES=$\{e_1, \ldots, e_m\}$, the set of embeddings of a subgraph $S(V_S; E_S; L_S)$ in a graph G, let $M_i$ be the subgraph isomorphism of S to $e_i$. The MNI support metric of S in G, denoted by Supp(S; G), is defined as follows:

$$Supp(S;G) = \min_{v \in V_S} |MNI_{col}(v)|, \text{ where:}$$

$$|MNI_{col}(v)| = \{M_i(v) \text{ for all } e_i \in ES\}_{\neq}.$$

An $MNI_{tbl}$ consists of a set of $MNI_{col}$; the MNI metric returns the length of the smallest $MNI_{col}$. FIGS. 1A through 1C show an example of how to compute Supp(S;G) of S (FIG. 1B) in G (FIG. 1A). Assuming the support threshold τ is 3, for a subgraph S to be frequent, each of its $MNI_{col}$ have to contain at least three distinct nodes. Given the three embeddings highlighted in FIG. 1A with circles, $MNI_{col}(v_1)$: $\{u_1; u_{21}; u_{17}\}$, $MNI_{col}(v_2)$:$\{u_2; u_{19}; u_{16}\}$ and $MNI_{col}(v_3)$: $\{u_3; u_{20}; u_{15}\}$. FIG. 1C shows the resulting $MNI_{tbl}$, S is reported as a frequent subgraph since all columns have size of three. Note that by only inspecting three embeddings, S is reported as a frequent subgraph, regardless of the actual number of embeddings. Assume another support value, τ=6. Starting with $v_1$, six distinct valid assignments are found. $\{u_1, u_{21}, u_{17}, u_{14}, u_{11}, u_8\}$ which is enough for τ. As for $v_2$, only five distinct nodes are found: $\{u_2; u_{19}; u_{16}; u_{12}; u_9\}$. Since the size of $MNI_{col}(v_2)$ is less than τ, the algorithm terminates and S is reported as being infrequent. For this case, $MNI_{col}(v_2)$, which is the reason for S to be infrequent, is called an invalid column.

The goal of FSM in a static graph is to find the set of frequent subgraphs. Utilizing the MNI metric, the result set of the FSM task is defined as follows:

Given a static graph G and support threshold τ, the FSM result set R is defined as follows:

$$R = \{Sub_1, \ldots, Sub_n\},$$

where each $Sub_i \in R$ has Supp($Sub_i$, G) greater than or equal to τ.

FIG. 2 illustrates a search space 200 for a typical FSM task. As shown in FIG. 2, the FSM search space 200 starting from small subgraphs 210 at the bottom of the figure to larger subgraphs 220 towards the top of the figure. For example, exemplary subgraphs 212, 214, 218 illustrate a range of subgraph size from top-to-bottom of the search space 200.

Each element (circle) in FIG. 2 represents a subgraph of the input graph. The elements at the bottom of the search space 200 represent subgraphs with one edge. For each subsequent higher row in the search space 200, each subgraph is extended by one edge. The topmost element represents the input graph (the largest possible subgraph in the search space). The number of elements at each level increases for each subsequent row, because the possible number of edge combinations increases as the subgraphs get larger. Once a certain level is reached, the input graph constrains these extensions and the number of elements decreases for next levels, in a known manner. FIG. 2 shows that the search space is divided into two sets; a set R of frequent (and maximal frequent) subgraphs and a set of infrequent (and minimal infrequent) subgraphs. The maximal frequent subgraphs (MFS) are usually used to efficiently represent the set of frequent subgraphs, which is defined as follows:

MFS=$\{S_1, \ldots, S_m\}$ is the set of all maximal frequent subgraphs such that for every $S_i \in$ MFS, $S_i$ is frequent and there is no other $S_j \in R$, where $S_i$ is a subgraph of $S_j$.

MFS is a compressed representation of the FSM result set (R); any frequent subgraph can be constructed from the elements in MFS. As shown in FIG. 2, the number of elements in MFS is much smaller than those in R. Thus, focusing on MFS rather than R allows for performance improvement. Another interesting set is the set of minimal infrequent subgraphs (MIFS):

MIFS=$\{S_1, \ldots, S_m\}$ is the set of all minimal infrequent subgraphs such that for every $S_i \in$ MIFS, $S_i$ is infrequent and there is no other $S_j \notin R$, where $S_j$ is a subgraph of $S_i$.

The set of infrequent subgraphs is often huge, MIFS is a feasible representation for this set. Other infrequent subgraphs can be constructed by extending elements from MIFS. In the dynamic graph setting, the goal of FSM is to continuously report the result set while the graph is updated. In this setting, FSM is defined as follows:

Given a dynamic graph $G_D$ and a minimum support threshold τ, the problem of frequent subgraph mining in dynamic graph $G_D$ is to continuously report the result set $R_t = \{Sub_1, \ldots, Sub_n\}$, where each $Sub_i \in R_t$ has Supp($Sub_i$; $G_D$)≥τ after graph updates at time t.

Dynamic graph updates can be considered as a stream of edge and node updates. Updates are either additions, deletions or label modifications. Adding or removing a node transforms to edge additions or deletions. Operations like updating edge/node labels can be supported by removing the edge/node then inserting it again with the new label. The present discussion focuses on edge updates since they are complex and require significant computation.

Figure 3B:
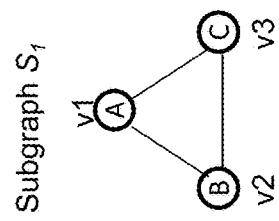
FIGS. 3B and 3C illustrate two possible subgraphs of the dynamic graph G of FIG. 3A.
Figure 3C:
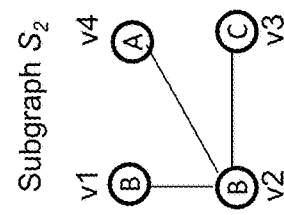
Figure 3A:
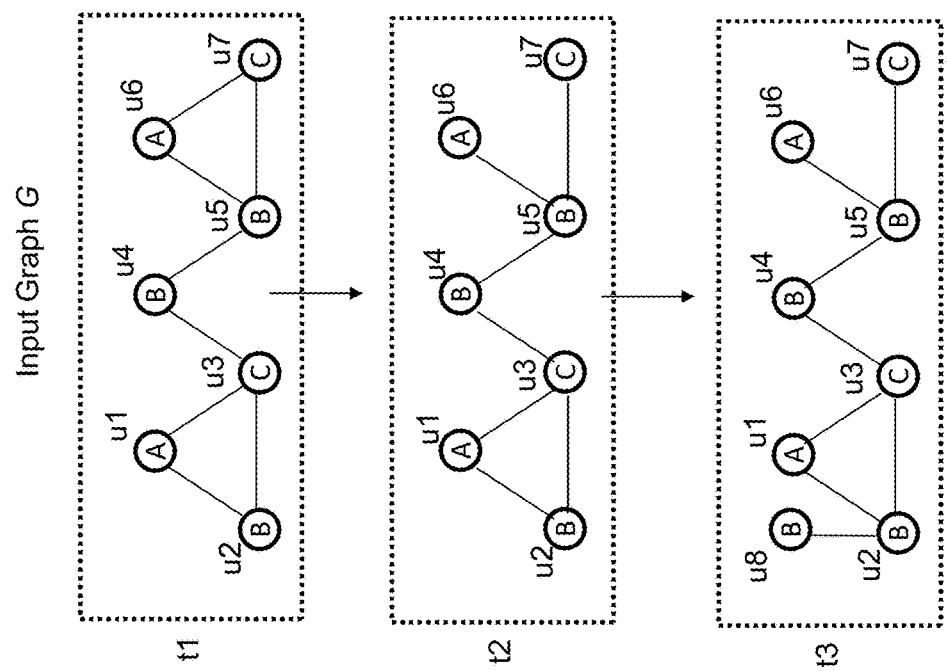
FIG. 3A illustrates an example of a dynamic graph G at subsequent points in time, used to illustrate at least one embodiment of the invention.

FIG. 3A illustrates an example of a dynamic graph G at subsequent points in time ($t_1$, $t_2$ and $t_3$), used to illustrate at least one embodiment of the invention. FIGS. 3B and 3C illustrate two possible subgraphs of the dynamic graph G of FIG. 3A. Suppose τ=2 and G is the input dynamic graph. At time $t_1$, the number of matches of subgraph $S_1$ (shown in FIG. 3B) is two, while subgraph $S_2$ (shown in FIG. 3C) has only one match; hence, $S_1$ is frequent and $S_2$ is infrequent. Advancing to time $t_2$, edge $u_6\_u_7$ is deleted, and the number of matches of $S_1$ becomes one while the number of matches does not change for $S_2$. As a result, both $S_1$ and $S_2$ are infrequent. At time $t_3$, edge $u_2\_u_8$ is added, which increases the number of matches of $S_2$ to two; thus, $S_2$ becomes frequent.

Incremental Graph Mining

Incremental Graph Mining (IncGM), is an incremental FSM solution for dynamic graphs. In one or more embodiments, the exemplary implementation of IncGM employs three novel techniques to improve the efficiency. First, the exemplary implementation of IncGM employs the "fringe" concept for incremental search space evaluation. Moreover, the exemplary implementation of IncGM applies a set of pruning techniques on the fringe. Consequently, significant processing overhead is avoided. Second, the exemplary implementation of IncGM maintains a minimal number of embeddings for each fringe subgraph. These embeddings are used either to enhance or to avoid a significant number of fringe subgraph evaluations. Finally, the exemplary implementation of IncGM utilizes a set of information collected during past iterations. This information guides the execution towards quicker decisions for next iterations.

Fringe Pruning

In one or more embodiments, IncGM utilizes a fringe consisting of the two sets; MIFS and MFS. An example of the fringe is shown in FIG. 2. The fringe is comprised of the minimal infrequent patterns and maximal frequent patterns. By using this fringe, the search space is significantly reduced and focus is given to those subgraphs that are more sensitive to change. Evaluating a subgraph S (i.e., computing its support value) requires significant overhead for finding existing matches of S. Compare this overhead with the simpler case of support computation for itemset mining. Most updates do not change the current set of frequent subgraphs, the rest usually affects a small number of subgraphs. In order to alleviate the overhead associated with subgraph evaluation, it is better to avoid evaluating fringe subgraphs that are not expected to be affected by graph updates. In the following, two propositions are presented that can be leveraged for performance improvement.

Proposition 1:

Adding an edge to the input graph results in increasing the support of one or more subgraphs. Thus, after an edge addition at time t, the only difference (if exists) between the result set $R_{t-1}$ and $R_t$ is the addition of one or more subgraphs to $R_t$.

Proposition 2:

Removing an edge from the input graph results in decreasing the support of one or more subgraphs. Thus, after an edge deletion at time t, the only change that might happen to the result set R is to remove one or more subgraphs from $R_{t-1}$.

Based on these propositions, after edge additions, only elements of MIFS need to be evaluated. As for edge deletions, only elements of MFS need evaluation.

FIG. 4 illustrates exemplary pseudo code of a fringe based mining process 400 according to one embodiment of the invention. Generally, the fringe based mining process 400 illustrates how mining is conducted based on fringe pruning. In the exemplary fringe based mining process 400, a subgraph S is evaluated only if it is infrequent and the update is edge addition (line 4), or S is frequent and the update is edge deletion (line 8). Computing the new support is done by calling UpdateSupport (in line 5 or line 9). The UpdateSupport function searches for embeddings of S in G, and then computes the new support based on those embeddings. The exemplary implementation of IncGM does not maintain embeddings information. Thus, support computation is done from scratch every time, such computation requires extra overhead. When a subgraph changes its status, the fringe is recursively updated by calling updateFringe (Lines 6 and 10).

For a subgraph $S_{freq}$ that is found to be frequent, an exemplary implementation of updateFringe updates the fringe by: (1) Adding $S_{freq}$ to MFS, (2) Removing $S_{freq}$ from MIFS, and (3) Adding the extension subgraphs of $S_{freq}$ to MIFS. Then, the added extensions are recursively evaluated.

For a new infrequent subgraph $S_{infreq}$, an exemplary implementation of updateFringe updates the fringe by: (1) Adding $S_{infreq}$ to MIFS, (2) Removing $S_{infreq}$ from MFS, and (3) Adding decompositions of $S_{infreq}$ to MFS. These decompositions are created by removing one edge at a time from the original subgraph. Finally, the added decompositions are recursively evaluated. Lines 5 and 9 contain an extra pruning step, where S is processed only if U is contained in S. This pruning is possible since there is no way to affect the support of a subgraph S by an edge update that is not contained in S. Line 1 contains an important step for the correctness of the algorithm. When updating the graph with an edge that was never seen before, this edge is added to MIFS. Without this step, this edge would not have been considered for evaluation. Consequently, the system would fail to recognize this edge as frequent when enough similar edges are added to the graph.

It is noted that any subgraph in the search space is accessible by extending the set of edges appearing in the graph. If the edge is infrequent, then it is added to MIFS. Otherwise, the edge either belongs to MFS or is a subgraph of an element belonging to MFS. Thus, utilizing the fringe, the whole search space is accessible. Since evaluation is computed for each element in the fringe, then all of its subgraphs are substantially guaranteed to have correct decision. For other subgraphs that are outside the fringe, they are substantially guaranteed to be represented by the correct set (i.e., MIFS or MFS) by calling updateFringe and the anti-monotone property.

Utilizing the disclosed propositions and optimizations, fringe evaluation is significantly optimized. However, the exemplary fringe based mining process 400 may suffer from considerable overhead caused by UpdateSupport. Performance can optionally be optimized in two ways. First, by optimizing UpdateSupport. Second, by limiting the number of times UpdateSupport is called. These improvements are discussed hereinafter.

Embeddings-Based Optimization

In at least one embodiment, UpdateSupport incurs the most computation overhead, and most of this computation is devoted to searching for embeddings from scratch. Reducing this overhead can be achieved by maintaining a list of embeddings so that finding embeddings from scratch is avoided. Storing all embeddings is prohibitively expensive, since the number of embeddings grows exponentially with the graph size. An applicable approach is to store a substantially minimal number of embeddings, which is small enough to fit in the available memory. As such, the disclosed approach adopts the following guidelines:

For each subgraph S∈MFS, only store embeddings that S needs in order to have support value ≥τ. Each embedding corresponds to at least one cell in the $MNI_{tbl}$, and in many cases a single embedding corresponds to more than one cell. Consequently, the upper bound for the number of stored embeddings is τ·|S|, where |S| is the number of nodes in subgraph S. Recall the example of FIG. 1, when τ=3. Only 3 embeddings were required to satisfy τ, regardless of the actual number of existing embeddings. Each stored embedding populates 3 cells with distinct nodes.

For each subgraph S∈MIFS, store all of its embeddings. MIFS contains infrequent subgraphs. For an infrequent subgraph S, which by definition has support less than τ, there must be at least one $MNI_{col}$ that has a number of valid nodes less than τ. Thus, the number of embeddings for an infrequent subgraph is bounded by T·|S|, where T<τ.

Utilizing the above guidelines, the number of stored embeddings for both MFS and MIFS is bounded by τ. Storing them as a simple list, however, may be inefficient. For efficient maintenance of the stored embeddings, one or more embodiments employ a fast embeddings lookup store (FELS). FELS allows efficient addition and removal of embeddings. Moreover, MNI-based support computation is significantly accelerated by FELS. More details about FELS are discussed below in the section entitled "Fast Embeddings Lookup Store (FELS)."

Figure 5:
FIG. 5 illustrates exemplary pseudo code of a dynamic mining process according to one embodiment of the invention.

FIG. 5 illustrates exemplary pseudo code of a dynamic mining process 500 according to one embodiment of the invention. Generally, the exemplary dynamic mining process 500 is an incremental mining algorithm that exploits the materialized embeddings. In at least one exemplary implementation, when an edge is added (Line 3), the added edge is only needed to search for new embeddings instead of searching for old embeddings from scratch. At line 5, searchLimited finds the new embeddings by applying subgraph isomorphism starting with the new edge. Those newly found embeddings are added to the FELS object associated with S (Line 8). Then, the current subgraph is checked for being frequent (Line 10). Such check is efficiently conducted by utilizing the FELS object. Finally, the fringe is updated accordingly (Line 10). Note that, without maintaining the list of embeddings, it is required to call UpdateSupport, which needs to search for embeddings from scratch.

When a new edge is added to the graph, a SearchLimited function looks for new embeddings created after the addition of that edge. This search is conducted on nodes where the new edge appears. Assume that there exists thousands of embeddings containing both nodes, finding all these embeddings takes time. Since there is no need to find all of the embeddings, it is more efficient, for that scenario, to follow the "UpdateSupport" approach, where only finding one embedding is sufficient to for each graph node.

SearchLimited optionally employs the following optimization: In some cases, the local area around the added edge is dense and contains a large number of embeddings. Only in such scenario, searching the local area for all embeddings poses extra overhead compared with UpdateSupport, which is designed to efficiently fill the MNI table following the work of M. Elseidy et al., "Grami: Frequent Subgraph and Pattern Mining in a Single Large Graph," PVLDB, Vol. 7, 517-28 (2014). Hence, a limit on the number of embeddings is set. While searching the local area for new embeddings, if the number of found embeddings exceeds that limit, the algorithm halts and falls back to the normal support computation method (UpdateSupport). This is one case where UpdateSupport may be needed for edge additions.

By maintaining the list of embeddings, calling UpdateSupport after edge deletion is almost avoided. When an edge is deleted, some of the maintained embeddings will vanish and need to be removed from the list of embeddings associated with a subgraph S (Line 13). In many cases, the deleted edge does not affect any of the stored embeddings, especially when the input graph is large, and the stored embeddings represent a small portion of the graph. In such cases, the support of S is not affected. If an edge deletion results in the removal of stored embeddings, then MNI is computed using the remaining ones. If, based on the currently maintained embeddings, the computed MNI value satisfies τ, then there is no need to do further processing (Line 15). Otherwise, UpdateSupport is required to find more embeddings (Line 16).

Note the difference between edge additions and edge deletions. For edge additions, only elements in MIFS are processed. While, for edge deletions, elements in both MFS and MIFS are processed. The following discussion highlights the reasons for this. Note that, edge additions are more expensive than deletions. For edge additions, new embeddings are to be found, which is an expensive task. While for edge deletions, obsolete embeddings are removed from the embeddings lists, which is efficiently done by the novel data structure (FELS). Due to its efficiency, edge removal is not postponed and is immediately applied to the two sets: MIFS and MFS (Line 13). While for edge addition, in order to minimize processing overhead, embeddings are only added to subgraphs belonging to MIFS. Consequently, not all existing embeddings of subgraphs in MFS are maintained. Thus, when the maintained embeddings of a subgraph cannot satisfy τ at line 15, there is a possibility that it is still frequent. For such a case, calling UpdateSupport is required to look for other embeddings that were not discovered before (Line 16).

It is noted that decisions regarding infrequent fringe subgraphs are based on the substantially complete list of existing embeddings. Thus, these decisions are substantially guaranteed to be correct. As for frequent fringe subgraphs, they only maintain a minimal number of embeddings to satisfy τ. When graph update is edge addition, then there is no effect on the decision. When the update is edge deletion and it does not affect the set of embeddings, the decision will not be affected as it is based on maintained embeddings which are not affected. If it affects the maintained embeddings, then full re-evaluation is used to guarantee the correctness.

Fast Embeddings Lookup Store (FELS)

The purpose of FELS is to efficiently access and update a list of embeddings, as well as to compute the MNI support based on these embeddings.

Components: FELS is composed of three components: (1) a hash table of embeddings, (2) an inverted index from nodes to embeddings, and (3) a modified MNI table. For quick lookup, each embedding has a unique key. Keys are simply created by concatenating the embedding node IDs ordered by the corresponding subgraph node IDs. As for the inverted index, it is used to efficiently access embeddings given node IDs. The last component, the MNI table, is used for the efficient update and retrieval of the MNI-based support value. Each cell represents a graph node and contains an extra counter value. This value counts how many embeddings are pointed to by this node.

Figure 6A:
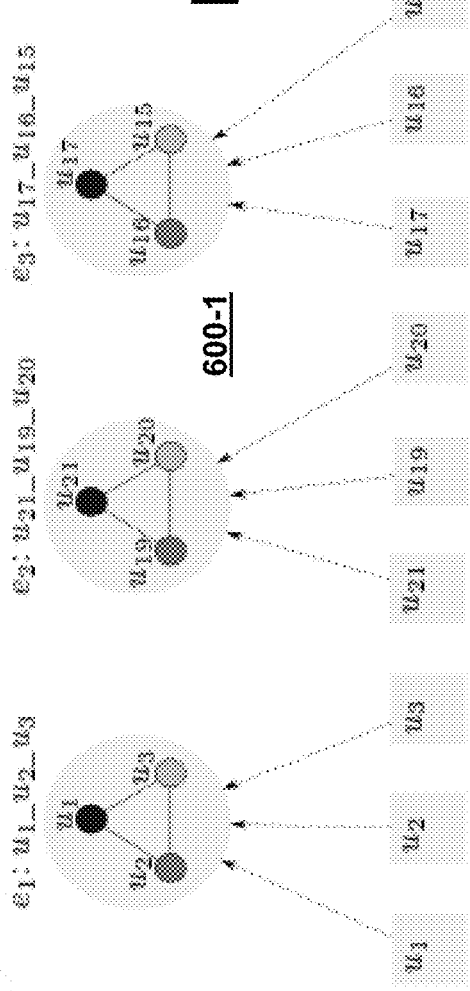
FIGS. 6A and 6B, collectively, illustrate an exemplary implementation of a Fast Embeddings Lookup Store (FELS) object of subgraph S from FIG. 1B, according to one embodiment of the invention.
Figure 6B:
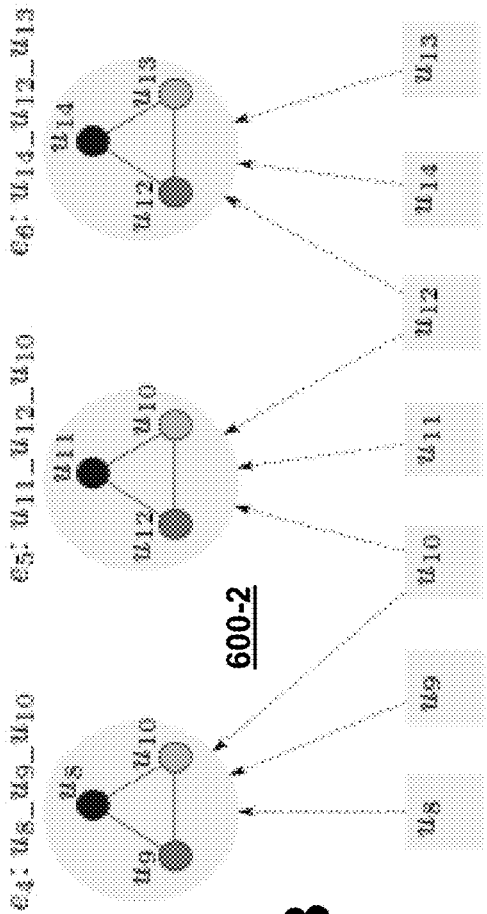

FIGS. 6A and 6B, collectively, illustrate an exemplary implementation of the FELS object 600-1 and 600-2, respectively, of subgraph S from FIG. 1B, and FIG. 6C shows the corresponding MNI table 650. There are a total of 6 embeddings: $\{e_1, e_2, e_3, e_4, e_5, e_6\}$, each one with its own key. For example, embedding $e_2$ has key: "$u_{21}\ u_{19}\ u_{20}$". The inverted index in FIGS. 6A and 6B contains 16 distinct graph nodes, each node indexes the embeddings it is contained in. For example, $e_2$ is indexed by $u_{21}$, $u_{19}$ and $u_{20}$. Some nodes may index more than one embedding such as $u_{12}$ which indexes two embeddings $e_5$ and $e_6$.

FIG. 6C shows the MNI table 650, each column is populated with distinct nodes corresponding to a specific node∈S. There is a counter value attached to each cell representing the number of embeddings indexed by the node corresponding to this cell. For example, node $u_{12}$ has a value 2 as it indexes two embeddings: $e_5$ and $e_6$.

Operations on Embeddings: FELS supports efficient operations like the addition and removal of embeddings. For adding an embedding E, its key is generated, and both the key and the embedding are added to the embeddings list. The key is used to efficiently assure that an embedding does not exist more than once. For each node in E, it is added to the inverted index and points to E. Also, each node in E has to be added to the MNI table 650. If the node does not already exist in its corresponding $MNI_{col}$, then an entry is created, and its counter is set to 1. Otherwise, the counter in the MNI table 650 associated with its entry is incremented. As for embeddings removal, the key of an embedding E is used to efficiently remove it from the list. Then, each node $u \in E$ is removed from the inverted index if u does not point to any other embedding. Finally, a node is removed from the MNI table if its corresponding counter equals 1; otherwise the counter is decremented.

MNI Computation: FELS utilizes the existing embeddings to compute the MNI values. This is efficiently done by checking the length of each $MNI_{col}$ and reporting the minimum length as the new MNI value. For example, in FIGS. 6A through 6C, given $\tau=5$, S is frequent because its support value based on the MNI table 650 is 5. Suppose that edge $u_{11\_}u_{12}$ is deleted from the input graph. Then, embedding $e_5$ becomes obsolete and is removed from the inverted index and the MNI table 650. The new set of embeddings becomes: $\{e_1, e_2, e_3, e_4, e_6\}$. By consulting the MNI table 650, all of its columns become of length 5. Thus, the support value is still 5. This happens because $u_{12}$ and $u_{10}$ entries in the MNI table 650 both had a count of 2 (two embeddings indexed by each one). Since the embedding $(u_{11}, u_{12}, u_{10})$ is removed, the counter attached to each node is decremented and becomes 1. Thus, $u_{11}$ is removed, while $u_{12}$ and $u_{10}$ both remain in the MNI table 650.

Reordering

The order of processing can result in a significant performance difference. The problem is how to decide the best order to use. Better ordering can be achieved in one or more embodiments by exploiting some information collected during past iterations. Two ordering optimizations are employed in an exemplary implementation of IncGM:

1—Nodes reordering: Given an input graph G and a subgraph S, an invalid node is a node that belongs to G and cannot be part of an embedding of S in G. Checking the validity of these nodes is usually the reason behind most of the processing overhead. To enhance the performance, the list of invalid nodes is optionally maintained during previous iterations. Then, while evaluating the support of S in subsequent iterations, invalid nodes are postponed for the hope that other nodes can satisfy $\tau$. As such, a significant amount of computation associated with invalid nodes is avoided.

2—$MNI_{col}$ reordering: A subgraph is infrequent if it has at least one invalid column. It is usually normal for infrequent subgraphs to stay infrequent and to have the same invalid column in future iterations. After evaluating the support of infrequent subgraphs, an exemplary implementation of IncGM optionally maintains the invalid column for each one. Then, for future evaluations, IncGM starts by checking the invalid columns. As such, the redundant overhead of checking $MNI_{col}(S)$ other than the invalid ones is avoided.

Batching

For practical applications with heavy workloads, batching can optionally be used to speedup the processing. Grouping updates and processing them at once allows expensive support computations to be aggregated for improved efficiency. The disclosed batching approach comprises two parts; updates grouping and subgraphs pruning.

Updates Grouping

FIG. 7 illustrates exemplary pseudo code of an operation batching process 700 according to one embodiment of the invention. In one or more embodiments, updates grouping utilizes the following three steps: First, repeated updates are removed. For instance, when adding an edge $u_i\_u_j$ more than once, only one addition is considered. Second, edges that cancel each other are ignored. For example, when an edge $u_i\_u_j$ is added and then deleted, there is no need to process any of these two updates. The third optional optimization is grouping optimization which is non-trivial compared to the first two steps. The goal of grouping optimization is to assure that any subgraph is processed at most once, even if more than one edge update affects that subgraph. The first step is to group edge update of the same class together. Then, for each edge class, the set of affected subgraphs are identified. The final step is to union all the sets of affected subgraphs into a ToBeChecked list, which contains the set of subgraphs that need to be processed. It can be shown that significant processing saving can be achieved by using this optimization.

Subgraphs Pruning

The relationship among subgraphs belonging to ToBeChecked can be of great value. Each subgraph$\in$ToBeChecked can be either a child or a parent of one or more subgraphs$\in$ToBeChecked. A subgraph $S_1$ is a child of another subgraph $S_2$, if $S_1$ is infrequent and it is a supergraph of $S_2$. Also, a subgraph $S_2$ is a parent of $S_1$ if $S_2$ is a frequent subgraph and it is a subgraph of $S_1$. The following propositions highlight interesting properties of these relationships.

Proposition 3:

Given $S_1, S_2 \in$ToBeChecked. If a subgraph $S_1$ is a child of a subgraph $S_2$, and $S_2$ is checked and found to be infrequent. Then, $S_1$ can be safely removed from ToBeChecked.

Proposition 4:

Given $S_1, S_2 \in$ToBeChecked. If a subgraph $S_1$ is a parent of a subgraph $S_2$, and $S_2$ is checked and proved to be frequent. Then, $S_1$ can be safely removed from ToBeChecked.

Many candidate subgraphs can be pruned by leveraging propositions 3 and 4. The question is which subgraphs to start evaluating in order to maximize the benefits of this pruning. It is better to start with subgraphs that are about to change their status rather than processing subgraphs that will not be affected. For example, for an infrequent subgraph $S_1$ which is a child of a frequent subgraph $S_2$, if it is known that $S_1$ will become frequent after applying the current batch of updates, then it is better to start with $S_1$. Hence, processing of $S_2$ can be avoided. But, such information is not known in advance. One or more embodiments employ a heuristic-based solution. To predict a good ordering, an algorithm and scoring function are employed. The scoring function gives higher scores to subgraphs that are expected to change their status. The algorithm works as follow: First, all edge deletions are processed on all subgraphs $\in$ToBeChecked. Second, the ToBeChecked list is shortened by removing the subgraphs that are still frequent after the first step. Finally, ToBeChecked is sorted in a descending order according to the following scoring function:

$$\text{Score}(S) = |(\alpha_S + \#\text{Edges} * \beta_S) - \tau|,$$

where $\alpha_S$ is the previous support of S; #Edges is the number of edge additions in the current batch; and $\beta_S$ is the expected increase in the support of S per edge addition. $\beta_S$ is approximated from the previous iterations of edge updates: A list $L_S$ is maintained for each subgraph S in the fringe. Each element in $L_S$ represents the support increments of a single edge addition. Then, $\beta_S$ equals the median of the values of $L_S$. The final step of the algorithm is to evaluate the candidate subgraphs according to the ordered list. While evaluating the remaining candidates, parents of frequent subgraphs are removed from ToBeChecked as well as children of infrequent subgraphs. New subgraphs that arise as a result of extending existing subgraphs are appended to the end of ToBeChecked.

One or more embodiments of the invention utilize information collected during previous iterations. Such information is exploited to enhance the performance of next iterations. Furthermore, the disclosed fast embeddings lookup store (FELS) improves the efficiency of frequency evaluation. Batching can optionally be utilized to improve the performance. magnitude. Parallel computation platforms can be employed to scale to larger graphs.

Recent practical applications of graph-based applications utilize graphs that are large and frequently updated. The disclosed incremental frequent subgraph mining techniques for mining dynamic graphs employ improved pruning and indexing techniques. The "fringe" is used for the graph mining context by defining a set of "fringe subgraphs". At least one implementation of IncGM maintains the fringe subgraphs and leverages them to prune the search space. Moreover, the exemplary IncGM implementation utilizes information collected during past iterations to guide the processing in future iterations towards improved performance. Furthermore, the disclosed fast embeddings lookup store provides an index with minimal memory overhead. FELS stores selected embeddings of the fringe subgraphs. These embeddings are then utilized to substantially optimize or even avoid support evaluation of the fringe subgraphs. For additional efficiency, IncGM is optionally further extended for batch updates.

The FSM techniques depicted herein can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the FSM techniques depicted herein can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
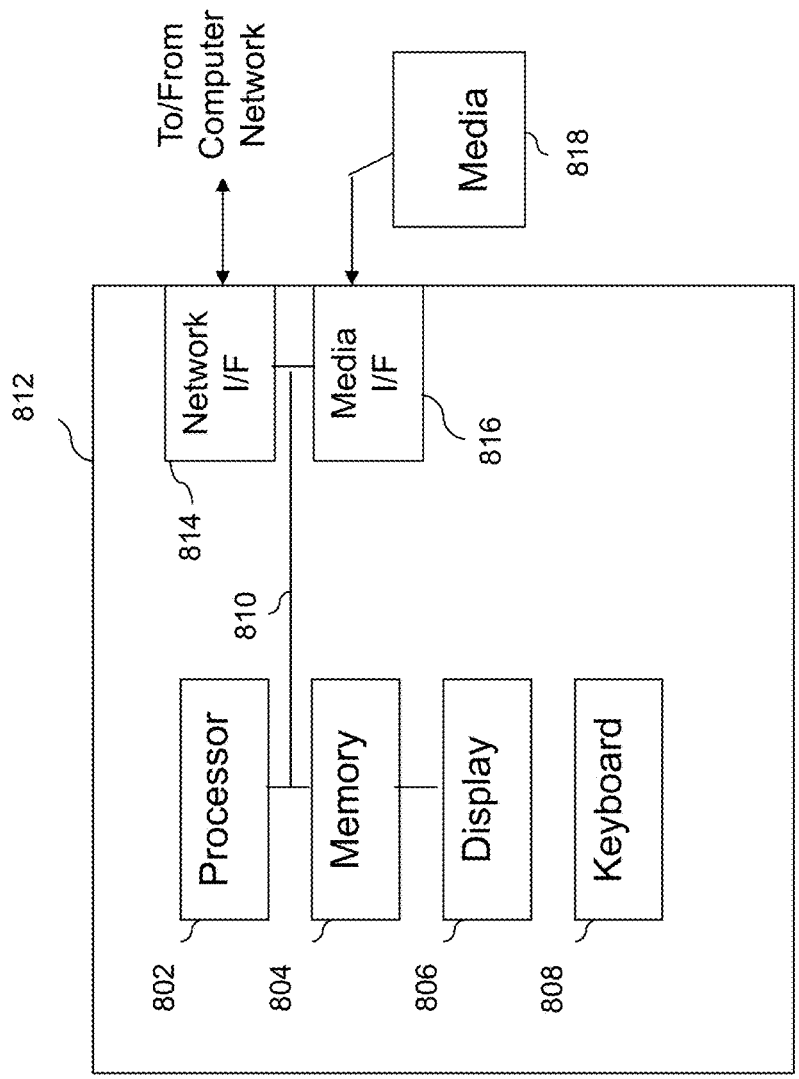
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

Figure 9:
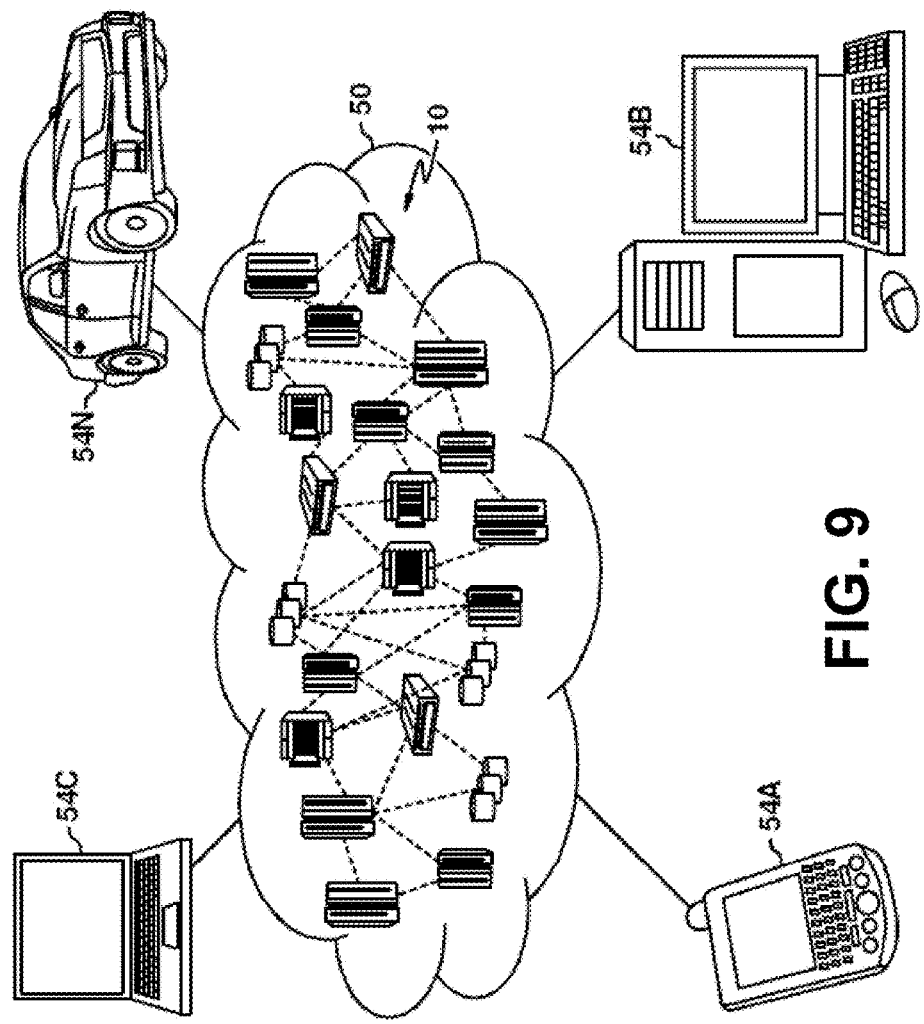
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described below, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
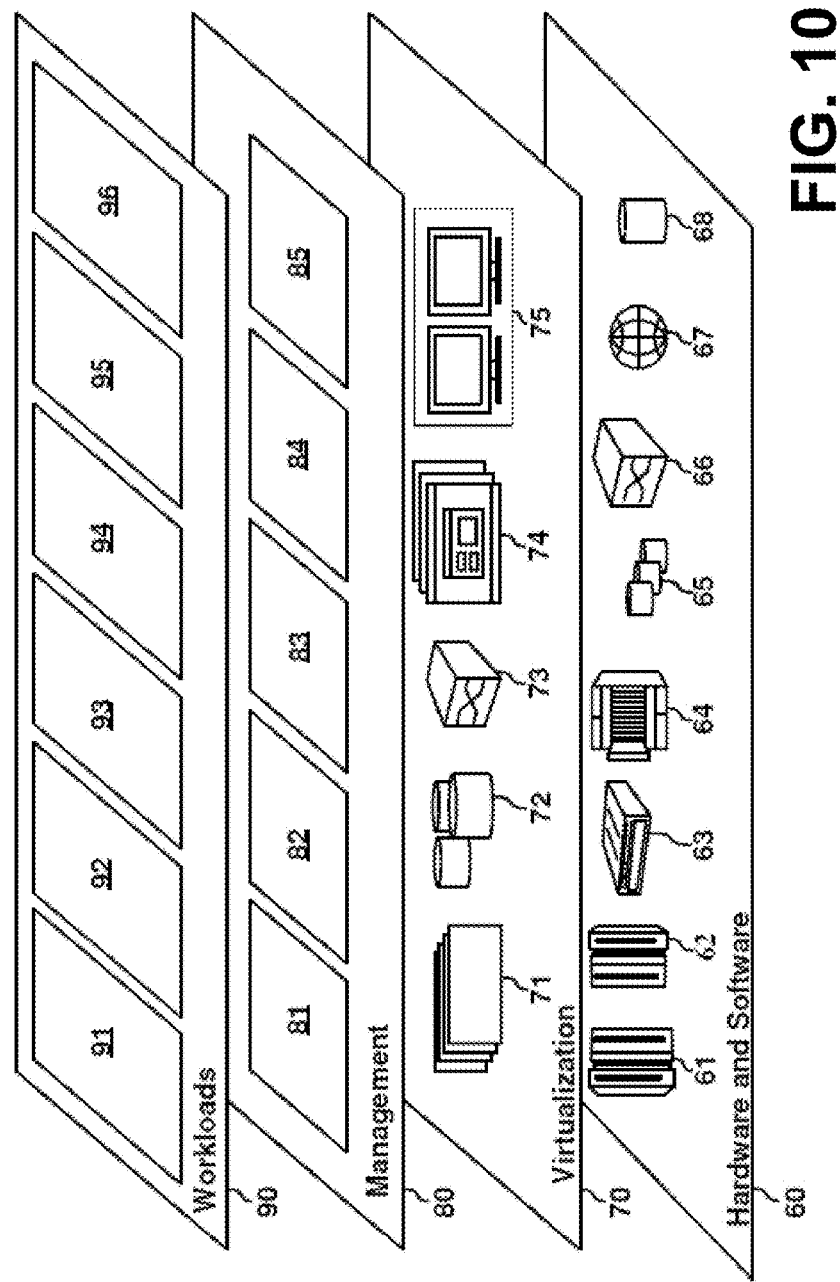
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 64; storage devices 65; networks and networking components 66. In some embodiments software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and frequent subgraph mining on dynamic graphs functionality according to the present invention 96.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations, pseudo code and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart, pseudo code and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that one or more embodiments of the invention are capable of being implemented in conjunction with any type of computing environment now known, such as cloud computing, or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing frequent subgraph mining techniques for mining dynamic graphs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented subgraph mining method, comprising:
    maintaining a set of embeddings comprising matching embeddings of a given subgraph in an input graph;
    maintaining a first fringe set of subgraphs comprising subgraphs substantially on a fringe of frequent subgraphs in said input graph that satisfy a predefined support threshold;
    maintaining a second fringe set of subgraphs comprising subgraphs substantially on a fringe of infrequent subgraphs in said input graph that do not satisfy said predefined support threshold;
    for an edge addition to the input graph, checking, using at least one processing device, a support of the subgraphs in said second fringe set based on said set of said embeddings and searching for new embeddings created by the edge addition; and
    for an edge deletion from the input graph, removing, using at least one processing device, obsolete embeddings that comprise said deleted edge from said first fringe set based on the said set of embeddings.

2. The method of claim 1, wherein said set of said embeddings further comprises, for each subgraph satisfying said predefined support threshold, only a substantially minimal set of embeddings that satisfy the predefined support threshold.

3. The method of claim 1, wherein said set of said embeddings further comprises, for each subgraph that does not satisfy said predefined support threshold, a substantially entire set of said embeddings.

4. The method of claim 1, wherein said set of said embeddings further comprises a hash table of said embeddings indexed by a key.

5. The method of claim 1, wherein said set of said embeddings further comprises an inverted index from said given graph node to said embeddings of said given subgraph that comprise said given node.

6. The method of claim 1, wherein said set of said embeddings further comprises a count value of how many of said embeddings are pointed to by the given node.

7. The method of claim 1, further comprising the step of batching a plurality of update operations to one or more of (1) evaluate each subgraph once for multiple edge changes, (2) prune updates that cancel each other out, and (3) remove redundant updates.

8. The method of claim 1, further comprising the step of postponing evaluation of one or more invalid nodes in determining whether a given subgraph satisfies said predefined support threshold, wherein said one or more invalid nodes is a node that belongs to said input graph and cannot be a part of said given subgraph in said input graph.

9. The method of claim 1, wherein software is provided as a service in a cloud environment.

10. A computer program product for subgraph mining, comprising a computer readable storage medium having program instructions embodied therewith, the program instructions executable by a device to cause the device to implement the following steps:
maintaining a set of embeddings comprising matching embeddings of a given subgraph in an input graph;
maintaining a first fringe set of subgraphs comprising subgraphs substantially on a fringe of frequent subgraphs in said input graph that satisfy a predefined support threshold;
maintaining a second fringe set of subgraphs comprising subgraphs substantially on a fringe of infrequent subgraphs in said input graph that do not satisfy said predefined support threshold;
for an edge addition to the input graph, checking, using at least one processing device, a support of the subgraphs in said second fringe set based on said set of said embeddings and searching for new embeddings created by the edge addition; and
for an edge deletion from the input graph, removing, using at least one processing device, obsolete embeddings that comprise said deleted edge from said first fringe set based on the said set of embeddings.

11. The computer program product of claim 10, wherein said set of said embeddings further comprises, for each subgraph satisfying said predefined support threshold, only a substantially minimal set of embeddings that satisfy the predefined support threshold.

12. The computer program product of claim 10, wherein said set of said embeddings further comprises, for each subgraph that does not satisfy said predefined support threshold, a substantially entire set of said embeddings.

13. The computer program product of claim 10, wherein said set of said embeddings further comprises one or more of a hash table of said embeddings indexed by a key and an inverted index from said given graph node to said embeddings of said given subgraph that comprise said given node.

14. The computer program product of claim 10, wherein said set of said embeddings further comprises a count value of how many of said embeddings are pointed to by the given node.

15. The computer program product of claim 10, further comprising the step of batching a plurality of update operations to one or more of (1) evaluate each subgraph once for multiple edge changes, (2) prune updates that cancel each other out, and (3) remove redundant updates.

16. The computer program product of claim 10, further comprising the step of postponing evaluation of one or more invalid nodes in determining whether a given subgraph satisfies said predefined support threshold, wherein said one or more invalid nodes is a node that belongs to said input graph and cannot be a part of said given subgraph in said input graph.

17. A system for subgraph mining, comprising:
a memory; and
at least one processing device coupled to the memory and configured for:
maintaining a set of embeddings comprising matching embeddings of a given subgraph in an input graph;
maintaining a first fringe set of subgraphs comprising subgraphs substantially on a fringe of frequent subgraphs in said input graph that satisfy a predefined support threshold;
maintaining a second fringe set of subgraphs comprising subgraphs substantially on a fringe of infrequent subgraphs in said input graph that do not satisfy said predefined support threshold;
for an edge addition to the input graph, checking, using at least one processing device, a support of the subgraphs in said second fringe set based on said set of said embeddings and searching for new embeddings created by the edge addition; and
for an edge deletion from the input graph, removing, using at least one processing device, obsolete embeddings that comprise said deleted edge from said first fringe set based on the said set of embeddings.

18. The system of claim 17, wherein said set of said embeddings further comprises one or more of (i) for each subgraph satisfying said predefined support threshold, only a substantially minimal set of embeddings that satisfy the predefined support threshold; and (ii) for each subgraph that does not satisfy said predefined support threshold, a substantially entire set of said embeddings.

19. The system of claim 17, wherein said set of said embeddings further comprises one or more of a hash table of said embeddings indexed by a key; an inverted index from said given graph node to said embeddings of said given subgraph that comprise said given node; and a count value of how many of said embeddings are pointed to by the given node.

20. The system of claim 17, further comprising the step of batching a plurality of update operations to one or more of (1) evaluate each subgraph once for multiple edge changes, (2) prune updates that cancel each other out, and (3) remove redundant updates.

* * * * *